July 23, 1963 P. H. KIRCHNER 3,098,929
ELECTRONIC CONTACT ANALOG SIMULATOR
Filed Jan. 2, 1959 4 Sheets-Sheet 1

Inventor:
Paul H. Kirchner,
by *[signature]*
His Attorney.

July 23, 1963 P. H. KIRCHNER 3,098,929
ELECTRONIC CONTACT ANALOG SIMULATOR
Filed Jan. 2, 1959 4 Sheets-Sheet 2

Inventor:
Paul H. Kirchner,
by Allen E. Campbell
His Attorney.

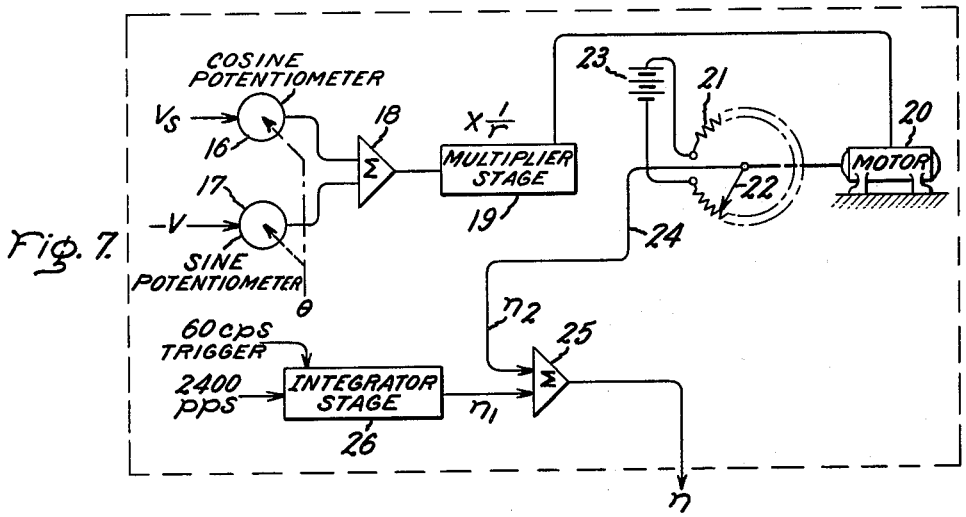
Fig. 7.
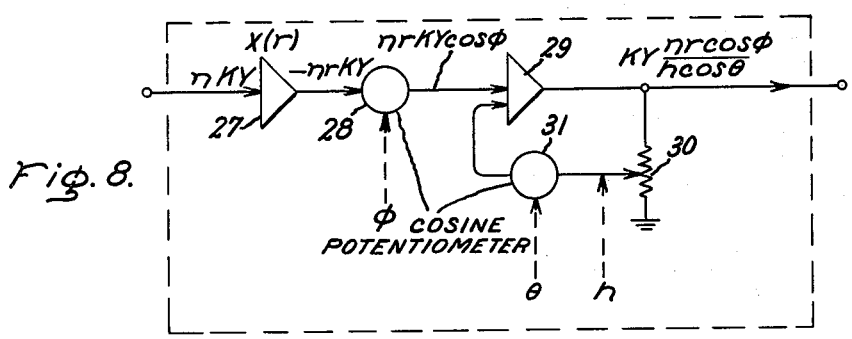
Fig. 8.
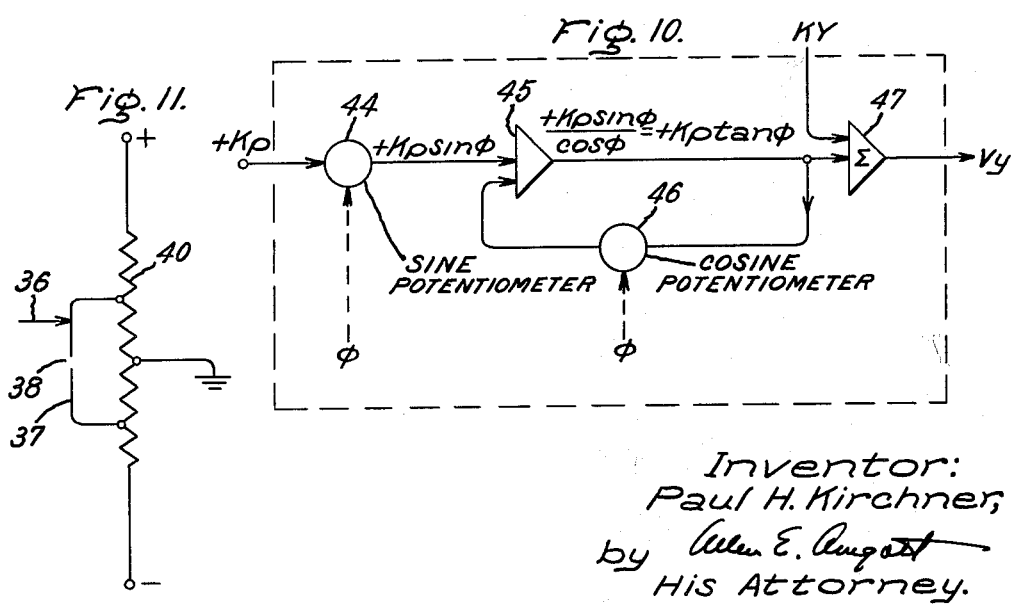

United States Patent Office 3,098,929
Patented July 23, 1963

3,098,929
ELECTRONIC CONTACT ANALOG SIMULATOR
Paul H. Kirchner, Ithaca, N.Y., assignor to General Electric Company, a corporation of New York
Filed Jan. 2, 1959, Ser. No. 784,717
6 Claims. (Cl. 235—187)

This invention relates to airborne instrumentation and more particularly to an electronic system for visually illustrating the instantaneous posture of an aircraft with respect to the earth's surface.

Under modern day flying conditions, the speed capabilities of many aircraft have caused the response time of the pilot to become increasingly significant. Studies in human engineering conducted by experimental research psychologists have established that the response time required for a pilot to perceive a hazardous condition from a numbered gauge and institute correctional action may often be unreasonably long as compared with the maximum permissible time interval during which such action should have been accomplished. This condition has caused certain military psychologists to regard the human factor in such a closed loop control system as the weakest link.

Among the innovations which have been resorted to in an attempt to speed the pilot's response time, a trend to pictorial designation has become marked. It has been shown that the human capability for acting in response to perception of a given color, or a picture is markedly more rapid than that which follows an attempt to read data such as a decimal number from a conventional gauge or the like.

In the present invention, the posture of an aircraft with respect to the ground terrain is rendered visually apparent within the cockpit of the aircraft. By utilizing certain trigonometric functions of conventional variables such as the pitch angle and the roll angle in conjunction with the voltage analog of the altitude, deflection potentials for a conventional cathode ray tube are derived. The grid pattern which is traced upon the phosphorescent inner surface of such a tube by utilizing these potentials appears to the pilot as a perspective view of the terrain passing under the aircraft. Motions described by the aircraft give rise to variations in the grid pattern and cause it to change in the same manner in which the actual appearance of the terrain would change to an observer.

Accordingly, therefore, a primary object of this invention is to disclose an electronic system for tracing a perspective view of the terrain beneath an aircraft on a cathode ray tube within the aircraft.

Another object of this invention is to teach circuitry and components for deriving cathode ray tube deflecting potentials which trace a picture representative of the relative position of an aircraft with respect to earth.

A further object of the present invention is to disclose method and means for computing and exploiting linear and trigonometric analog functions of conventionally sampled flight-variables for the purpose of producing a perspective grid pattern with a cathode ray tube.

A still further object of the invention is to provide means for electronically tracing a plurality of discrete lines on a cathode ray to provide a simulated view of terrain beneath an aircraft.

These and other objects and advantages of the invention will become apparent from the accompanying detailed description and drawings in which like numerals indicate like parts and in which:

FIGURE 7 depicts diagrammatically the circuitry and components of one of the $n$ generators shown in FIGURE 5;

FIGURE 8 illustrates diagrammatically the circuitry and components required for producing the analog potential $$nKY \frac{r \cos \phi}{h \cos \theta}$$

Figure 5:
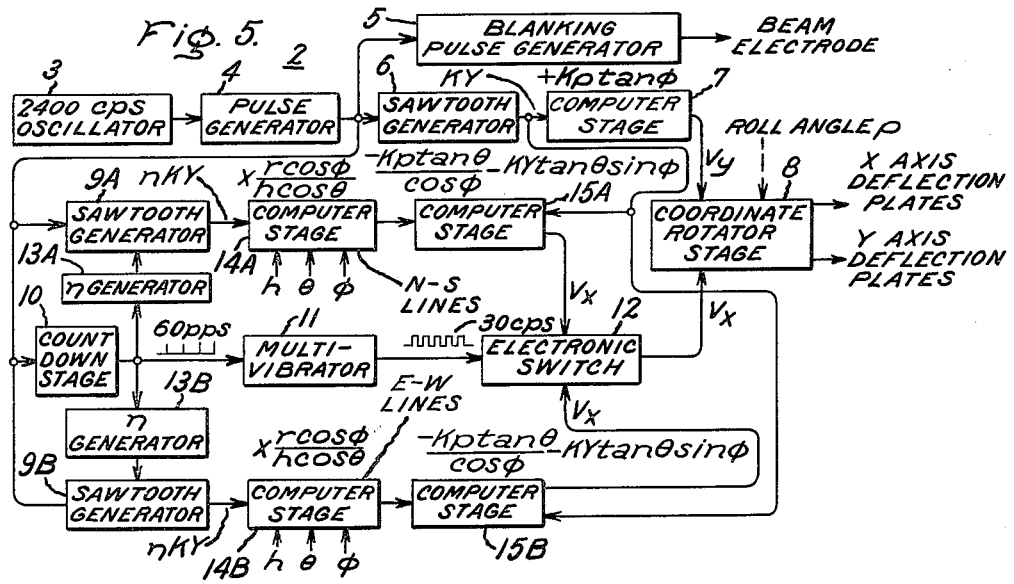
FIGURE 5 shows in block diagram form the circuitry and components utilized in generating potentials for application to the deflection electrodes of a cathode ray tube.
Figure 9:
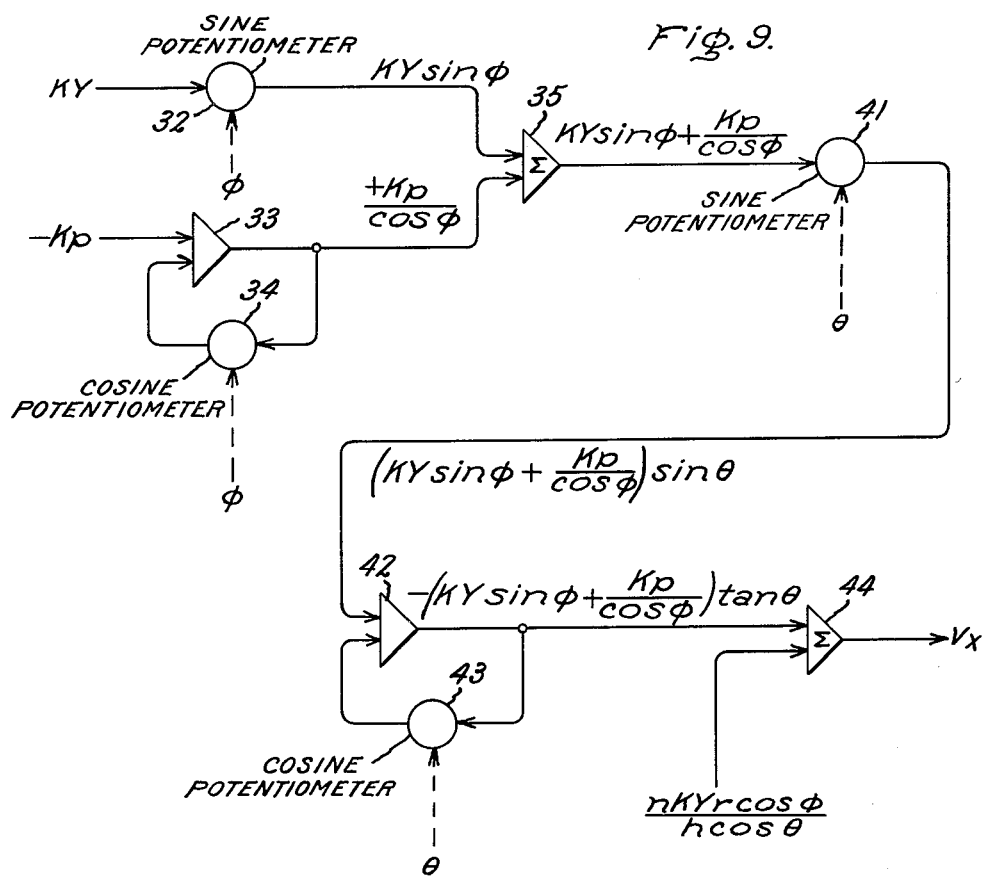

and corresponds to the similarly designated block in the diagram of FIGURE 5;

FIGURE 9 shows diagrammatically the system which is employed in generating the analog function $$-Kp \frac{\tan \theta}{\cos \phi} - KY \tan \theta \sin \phi$$

as shown in FIGURE 5;

FIGURE 10 shows diagrammatically the system which is employed in generating the analog function $+Kp \tan \phi$ as shown in FIGURE 5;

FIGURE 11 illustrates the details of a modified cosine potentiometer which may be used to compensate for the situation where the heading angle of the aircraft $\theta$ approaches 90°.

Figure 1:
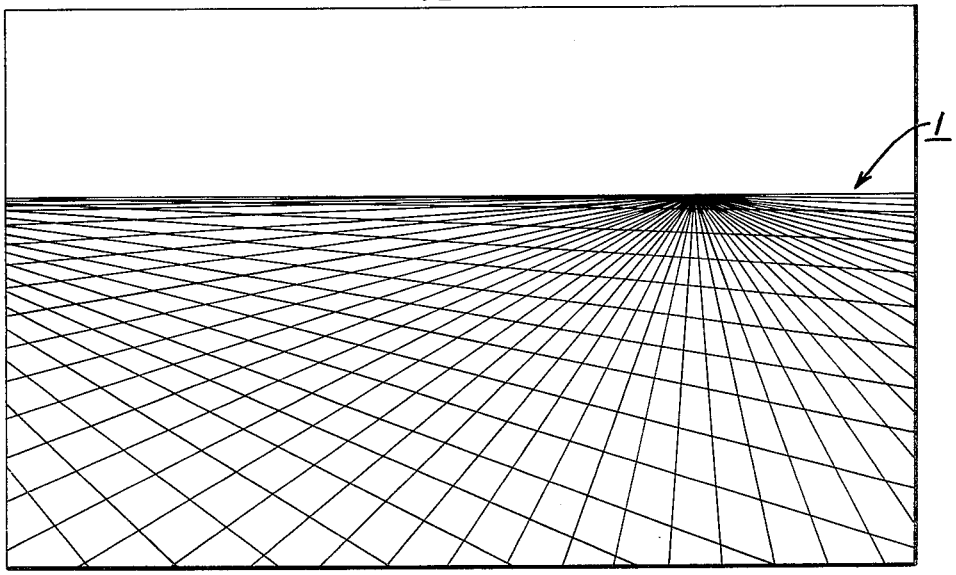
FIGURE 1 is a cathode ray display in the form of a perspective view of parallel and perpendicular lines which change in the same way in which the appearance of the ground changes during a displacement of the aircraft.

Turning now to the drawings, and more particularly to FIGURE 1, the numeral 1 indicates generally a contact analog display which is traced by an electron beam on the phosphorescent inner surface of a conventional cathode ray tube. This display will be seen to comprise a picture in perspective of a grid of parallel and perpendicular lines. The picture thus traced upon the cathode ray tube resembles the appearance of an infinitely large window screen viewed from an angle. The purpose of this picture upon the cathode ray tube is to provide the pilot of an aircraft with a display which artificially represents the ground as it would appear to him. By practicing the present invention, the grid pattern on the cathode ray tube is caused to change in exactly the same way in which the appearance of the ground varies during motions and maneuvers of the aircraft. By this means, the three dimensional pattern of the terrain beneath the aircraft is effectively collapsed by the electronic instrumentation into a two dimensional picture.

Figure 2:
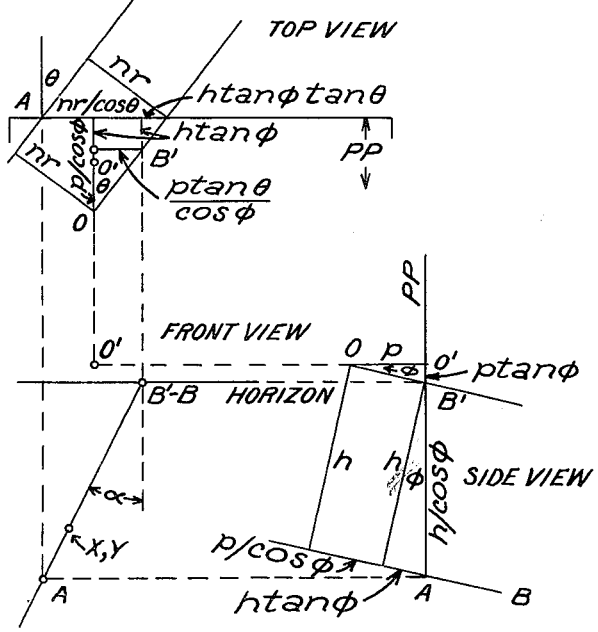
FIGURE 2 illustrates the geometrical constructions which are employed in deriving the relationships necessary for the production of the voltage which deflect the electron beam in a cathode ray tube.

In order to fully grasp the method by which condition responsive potentials are employed in tracing such a grid pattern on a cathode ray tube, it is necessary to appreciate the geometry set forth in FIGURE 2 of the present invention. Prior to a discussion of the geometrical relationships in FIGURE 2, it is convenient to designate certain of the flight parameters as follows:

Let $\phi$=the pitch angle of the aircraft, or the angle of viewing with respect to ground.

Let $\theta$=the heading angle of the aircraft, or the angle between the nose of the aircraft and the direction of one set of the parallel grid lines fixed with respect to north.

Let $(nr)$ = the distance measured in the ground plane and perpendicular to a ground line AB, from the observer (the aircraft) to AB.

Let $r$ = spacing between parallel lines of the pattern. The integral portion of $n$ indicates that a particular line such as AB is the $n$th line to the left of the point directly under the observer or aircraft.

Let $h$ = the height or altitude of the aircraft above ground.

Let $\alpha$ = the actual slope in the perspective view of the line AB.

Turning now to FIGURE 2, it should be appreciated that the scene considered consists of a single line, called AB, plus the horizon. The top portion of FIGURE 2 depicts an entire situation (observer, glass and scene) in plan view or top view looking perpendicular to the ground. At the right side of the figure, the entire situation is shown in profile view or side view. These views are used to construct a picture on the glass, called the Front Perspective View.

The observer's eye is at point O. The glass, represented by PP (for picture plane) in the figure, is edgewise in the side view, and coincides with the paper in the front view. In the top view, the ground plane coincides with the paper. The glass is considered to be in an erect position directly in front of the observer, and the point O′ is the point on the glass directly in front of the observer's eye. The line OO′, therefore, is perpendicular to the glass and parallel to the front-to-back axis of the aircraft. In the front view this line is seen endwise at the point O′ in the glass.

The horizon cannot be shown in the top view or side view, since it is at infinite distance, but its position in the front view can be determined.

The aircraft is assumed to have a positive (nose up) pitch angle $\phi$. To look at the horizon, the observer must lower his line-of-sight an angle $\phi$ from the straight-ahead position through O′. His line-of-sight now pierces the glass a distance $p \tan \phi$ below the point O′, where $p$ is the distance from O to O′, the shortest distance from his eye to the glass. All the points on the horizon, when transferred along the line-of-sight into the glass, form the line labeled Horizon in the front view, a distance $p \tan \phi$ below the point O′.

The line AB is a line along the ground. Therefore, in the side view, it appears to have a downward tilt $\phi$. The ground surface is seen edgewise in the side view, and is parallel to the line-of-sight from the observer to the horizon since the ground surface contains the horizon an infinite distance away. The perpendicular distance from the observer to the ground plane is $h$, the altitude of the aircraft. The position of the line AB on the surface of the ground is defined by a distance and an angle, both shown in the top view. The distance is $nr$ which should, for the time being, be regarded as a single symbol. This distance is measured from the point on the ground beneath the observer, perpendicular to the line AB. The angle $\theta$ is the difference between the bearing of AB and the heading of the aircraft.

The position of the picture of AB can be determined by locating two points on the line. The points chosen are the points A and B. Point B is where AB appears to intersect the horizon. Point B is an infinite distance from the observer. The line-of-sight to point B is thus parallel to AB. The spot where this line-of-sight pierces the glass is point B′ in the picture. Its horizontal distance from point O′ is found, from the top view, to be $$\frac{p \tan \theta}{\cos \phi}$$

The horizon has already been located.

If the glass and the line AB are extended far enough, AB will pierce the glass at point A. The line-of-sight to A also pierces the glass at A. The horizontal distance, in the picture, from A to B is seen in the top view to be $$\frac{nr}{\cos \theta} - h \tan \phi \tan \theta$$

and the side view shows the vertical distance to be $h/\cos \phi$.

The angle $\alpha$ is defined as in FIGURE 2 and its tangent is expressed as:

$$\tan \alpha = \frac{nr/\cos \theta - h \tan \phi \tan \theta}{h/\cos \phi} = \frac{nr \cos \phi}{h \cos \theta} - \sin \phi \tan \theta \quad (1)$$

An arbitrary point on the line AB in the picture is defined by X and Y, the horizontal and vertical distances from point B. Since this point is on the line AB:

$$X = Y \tan \alpha \quad (2)$$

The deflection voltages which deflect a spot on a cathode ray tube from B to the point X, Y, are KX and KY, where K is the deflection factor of the display tube. Multiplying both sides of the above equation by K, Equation 2 is obtained:

$$KX = KY \tan \alpha \quad (3)$$

The display is adjusted so that point O′ is the location of the spot when no deflection voltages are applied. Then the total deflection voltage, $V_x$ and $V_y$, must include the bias voltages to position the spot at B when X and Y are zero.

Let $X_0$ and $Y_0$ be the horizontal and vertical distances from O′ to B. Then:

$$V_x = KX + KX_0 \text{ and } V_y = KY + KY_0 \quad (4)$$

where $$X_0 = -\frac{p \tan \theta}{\cos \phi} \text{ and } Y_0 = +p \tan \phi \quad (5)$$

from FIGURE 2.

Substituting the expressions for $X_0$ and $Y_0$ we obtain:

$$V_x = KX - \frac{Kp \tan \theta}{\cos \phi} \quad (6)$$

$$V_y = KY + Kp \tan \phi \quad (7)$$

Substitute for KX the expression: $KY \tan \alpha$

Then:

$$V_x = KY \tan \alpha - \frac{Kp \tan \theta}{\cos \phi} \quad (8)$$

For $\tan \alpha$, substitute $$\frac{nr \cos \phi}{h \cos \theta} - h \tan \phi \tan \theta:$$

$$V_x = \left[ KY \frac{nr \cos \phi}{h \cos \theta} - \sin \phi \tan \theta \right] - \frac{Kp \tan \theta}{\cos \phi}$$

$$= \frac{nKYr \cos \phi}{h \cos \theta} - \left[ KY \sin \phi + \frac{Kp}{\cos \phi} \right] \tan \theta \quad (9)$$

To trace AB on the display, the distance Y is started at zero and increased uniformly with the time to the limit of the display. Both deflection voltages $V_x$ and $V_y$ are derived from the time-varying quantity Y.

Figure 3:
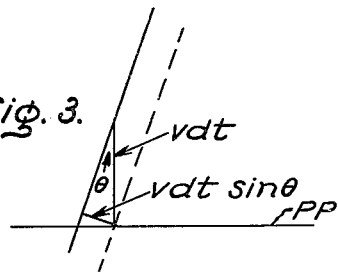
FIGURE 3 illustrates the geometry necessary to derive the mathematical relationships characteristic of differential changes due to forward velocity.
Figure 4:
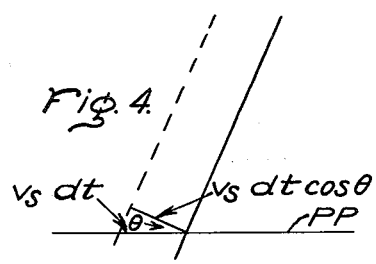
FIGURE 4 illustrates the geometry necessary to develop the mathematical relationships which characterize differential changes due to sideward velocity.

FIGURES 3 and 4 illustrate the changes in the display resulting from instantaneous velocities $v$ and $v_s$ where $v$ represents the forward component of ground speed, and $v_s$ represents the sideward component of ground speed.

In a small interval of time $dt$ the aircraft moves forward in FIGURE 3 a distance $vdt$. To an observer in the aircraft, a feature on the ground appears to move back a distance $vdt$. The apparent change in the location of the diagonal line AB is that component of its motion which is crosswise to its direction, $vdt \sin \theta$. The other component of the motion is along the direction of the line and results in no apparent change in the line.

Similarly, the sideward motion of the aircraft is $v_s dt$ to the right in FIGURE 4; of the line $v_s dt$ to the left. The component perpendicular to the line is $v_s dt \cos \theta$.

These two motions are changes in the distance designated $nr$. The motion $vdt \sin \theta$ is in a direction so as to decrease $nr$, while the motion $v_s dt \cos \theta$ increases $nr$. If $d(nr)$ is the increase in $nr$ in time $dt$, then:

$$d(nr) = v_s \cos \theta \, dt - v \sin \theta dt \quad (10)$$

At this point in the specification it is necessary to expand the interpretation of $nr$. The line AB is one of a family of parallel lines, with uniform spacing $r$. If the symbol $nr$ is now interpreted as the product of $n$ times $r$, $n$ represents the number of intervals $r$ contained in the distance $nr$.

Since $r$ is a constant, it can be removed from the differential above, and we can write:

$$rdn = v_s \cos \theta dt - v \sin \theta dt \quad (11)$$

Dividing both sides by $rdt$, $$dn/dt = 1/r (v_s \cos \theta - v \sin \theta) \quad (12)$$

The pitch angle $\phi$ and aircraft heading $\theta$ thus are utilized according to the invention in generating the display. The altitude $h$ with the speed components and roll angle are also utilized. Since almost all modern aircraft contain an altimeter, a speed indicator, a compass, and a device to determine pitch and roll attitude, conventional means for measuring these quantities are employed in practicing the invention. The trigonometric functions of the angles derived in the invention may be readily derived by function potentiometers or other equally suitable devices.

It will now be evident that all attitudes and motions of the aircraft can be simulated as follows:

(1) Turn, vary $\theta$
(2) Pitch, vary $\phi$
(3) Roll, rotate picture by means of a coordinate rotator.
(4) Forward motion and sideward motion, vary $n$: according to the relationship $dn/dt = 1r (v_s \cos \theta - v \sin \theta)$.
(5) Vertical motion, vary $h$.

Turning from the mathematical derivation of the energizing potentials which must be supplied to the deflection plates of the cathode ray tube, reference to FIGURE 5 will now be made.

In this figure, the numeral 2 has been used to indicate generally the block diagram of the circuitry and components employed in producing deflection potentials. In the lefthand portion of the diagram, the numeral 3 has been used to identify a conventional 2400 c.p.s. oscillator. The oscillator 3 may take the form of a conventional sine wave generator.

The output wave form from the oscillator 3 is applied directly to a pulse generator 4, which includes suitable circuitry for deriving a 2400 p.p.s. output pulse train from the oscillatory input signal. The generator 4 may include conventional differentiating and/or pulse shaping circuitry for producing the 2400 p.p.s. output potential.

A portion of the output potential from the pulse generator 4 is applied to a blanking pulse generator 5. The repetitive pulse train from the pulse generator 4 is also applied to the input terminals of a saw tooth generator 6 located directly to the right. The saw tooth generator 6 derives the KY component for the Y-axis deflection plates of the cathode ray tube. It will be recalled in this connection that the term KY merely comprises the product of a lineal distance on the cathode ray tube with the deflection factor in volts per unit distance.

The KY component derived in the saw tooth generator is applied to the input terminals of a computer stage 7 which derives the mathematical expression $+Kp \tan \phi$ and adds this value of potential to the term KY. It will be recalled from previous portions of the detailed description that the Y-axis deflecting potential $V_y$ is given by the expression $KY + Kp \tan \phi$.

The $V_y$ output potential of the computer stage 7 is applied to a coordinate rotator stage 8. The stage 8 is used to compensate the deflection of the electron beam within the cathode ray tube for aircraft roll. Rotator stage 8 employs conventional sine-cosine potentiometers which rotate the coordinates in accordance with the summary:

$$X' = X \cos \rho - Y \sin \rho$$
$$Y' = X \sin \rho + Y \cos \rho$$

In this equation X and Y correspond to the originally derived deflection voltages and the variable $\rho$ corresponds to the roll angle of the aircraft.

Returning to the detailed description of FIGURE 5, mention will again be made of the repetitive 2400 p.p.s. wave form derived by the pulse generator 4. This time spaced series of voltage impulses is used to provide triggering potentials for each channel of the double channel deflection system used for energizing the X-axis deflection plates of the cathode ray tube. Since each picture traced on the cathode ray tube contains two sets of lines, a pair of X-deflection channels is required. It will be appreciated that a single Y-deflection channel common to both sets of lines in the grid pattern is employed.

The 2400 p.p.s. wave form produced by the pulse generator 4 is connected to simultaneously energize a first saw tooth generator 9A located in one X-deflection channel and a second saw tooth generator 9B connected in the other channel. The 2400 p.p.s. signal is also supplied to a countdown stage 10 in order to effect a frequency reduction in the input signal. Such frequency reduction or countdown process may be accomplished by suitable stages of conventional circuitry such as cascaded flip-flops or the like.

The output wave form from the countdown stage 10 takes the form of a 60 p.p.s. wave train which is utilized as a switching trigger. This switching trigger is applied to a multivibrator 11 which derives a 30 c.p.s. square wave switching voltage at its output terminals. An electronic switch 12 is connected to receive the 30 c.p.s. switching voltage in order to alternately apply the output potentials from the pair of X-deflection channels to the X-axis deflection plates of the cathode ray tube. The resulting composite X-axis deflection potential is, of course, preliminarily applied to the coordinate rotator stage 8 to compensate for aircraft roll.

Returning now to that portion of the block diagram in FIGURE 5 which is employed in developing the first of the X-deflection potentials, the saw tooth generator 9A will again be referred to. The saw tooth generator 9A receives a value of potential "$n$" from an $n$ generator 13A illustrated directly therebeneath. The input potential for the $n$ generator 13 is received from the countdown stage 10 and takes the form of the repetitive 60 p.p.s. output signal produced by the latter stage.

The output of the saw tooth generator 9A takes the form of $nKY$, which means that the amplitude of the saw tooth voltage in this X-channel is controlled by the quantity $n$.

The $nKY$ potential thus derived is applied as an input signal to a computer stage 14A which derives the expression:

$$r \cos \phi / h \cos \theta$$

The computer stage 14A also derives the product of this fraction with the $nKY$ component received from the saw tooth generator 9A. The computer stage 14A thus has the function of assisting to derive the energizing potentials for producing the north-south line pattern on the face of the cathode ray tube.

The analog voltage $$nKYr \frac{\cos \phi}{h \cos \theta}$$

from stage 14A and the voltage KY derived from sawtooth generator 6 are supplied directly to the input terminals of a computer stage 15A for the purpose of completing the derivation of the X-axis deflection potential $V_x$.

The term $V_x$ must comprise the algebraic sum of three components as indicated in Equation 9. The specific circuitry which is employed in the block 15A is illustrated in FIGURE 9 and will be explained in detail in connection therewith.

Continuing with the detailed description of FIGURE 5 and more particularly with the circuitry and components in the second X-deflection channel, the saw tooth generator 9B in the lower portion of the drawing will now be referred to.

The generator 9B is connected to receive input potential of value "$n$" from the $n$ generator 13B illustrated immediately thereabove. The generator 13B is itself energized by the 60 p.p.s. switching trigger derived from the original 2400 p.p.s. signal by the countdown stage 10. The generator 9B produces the analog component $nKY$ at its output terminal, where the amplitude of the saw tooth voltage is again controlled by the quantity $n$.

This analog component is supplied to a computing stage 14B in which there is derived the quotient:

$$r \cos \phi / h \cos \theta$$

The quotient of these two trigonometric functions is multiplied by the value of the $nKY$ component present at the input terminals. The computer stage 14B will thus be seen to derive an analog potential which is used in developing the complete deflection voltages needed for tracing the east-west perspective lines on the grid pattern of the cathode ray tube.

The potential contribution $$nKYr\frac{\cos \phi}{h \cos \theta}$$

derived by the computer stage 14B together with the voltage KY derived from the sawtooth generator 6 are supplied to another computer stage 15B. The stage 15B derives two additional contributions to the total analog potential and electronically adds these values to the input component from 14B to produce an X-axis deflection potential $V_x$.

It is to be recognized that the angle $\theta$ utilized in the first X-deflection channel differs from the angle $\theta$ utilized in the second X-deflection channel by exactly 90 degrees.

In generating the north-south lines in the first X-deflection channel, $\theta$ is the aircraft heading with respect to the north direction. In generating the east-west lines in the second X-deflection channel, $\theta$ is the aircraft heading with respect to the east direction. Both angles are readily obtainable from flight instruments in the aircraft.

For the earlier portions of this specification, it will be recalled that the X-axis deflecting potential for the east-west lines is forced by the electronic switch 12 to alternate with the X-axis potential employed in tracing the north-south lines on the cathode ray tube.

Although the north-south and east-west grid patterns would theoretically process an infinite number of lines, the invention provides a finite number of lines in each such set. Half of the group of lines are positioned to the left of the vertical axis of the picture, and the remainder are positioned to the right of the vertical axis. According to the preferred embodiment of the invention, 40 lines may be provided in each set of lines.

Since each representation of the terrain on the cathode ray tube contains two such sets of lines, the reason for providing symmetrically identical X-deflection channels in FIGURE 5 will now be more fully appreciated. By means of the electronic switch 12, one picture is first painted by tracing all of the lines in one 40-line set, following which all the lines in the other 40-line set are traced on the inner surface of the cathode ray tube.

In the block diagram of the invention illustrated in FIGURE 5, thirty complete pictures per second are traced upon the inner end surface of the cathode ray tube. The over-all rate of tracing lines is then 40-lines per second times 2 times 30 pictures per second, or 2400 lines per second. As earlier explained, the output voltages of the two X-deflection channels are alternately applied to the X-axis deflection plates of the cathode ray tube at the rate of 30 cycles per second by the electronic switch 12. It will be appreciated that other suitable values for oscillator frequency and line-tracing rates would fall equally well within the purview of the appended claims.

The 2400 c.p.s. triggering of saw tooth generator 6 in the channel for producing the Y-axis deflection potentials causes the electron beam of the cathode ray tube to sweep vertically. The saw tooth generators 9A and 9B in the individual X-deflection channels are triggered synchronously in order to cause the electron beam to sweep horizontally. The amplitude of the saw tooth potential in each X-channel is controlled by the magnitude of $n$, as provided by the $n$ generators 13A and 13B associated with the respective channels. The horizon line in the grid pattern is traced by sweeping the X-direction with no vertical sweep potential once each cycle.

Figure 6A:
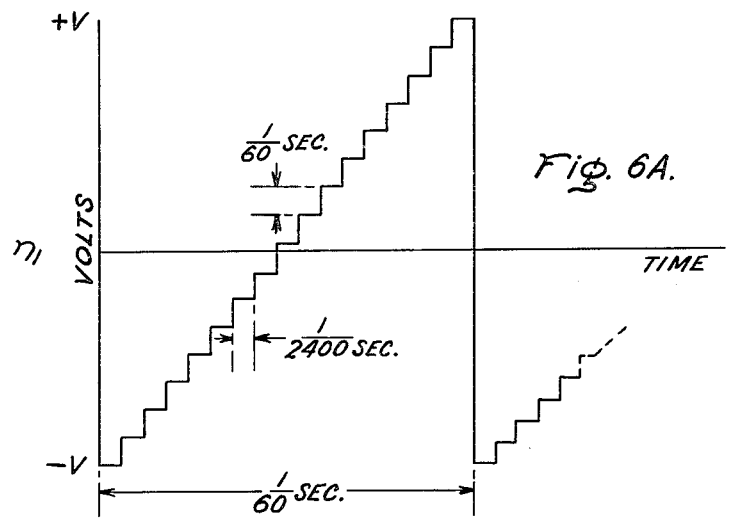
FIGURE 6A is a wave form diagram illustrating one of the component potentials derived by the $n$ generators in FIGURE 5.
Figure 6B:
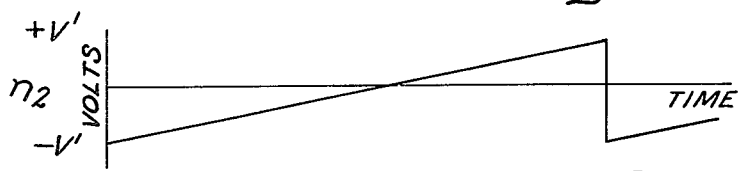
FIGURE 6B is a wave form diagram which illustrates a second voltage component derived within the $n$ generators illustrated in FIGURE 5.

Turning from the generalized description of the block diagram to the details of the several individual stages therein, reference to FIGURE 6A and FIGURE 6B will now be made.

The value $n$ which is supplied to the saw tooth generators 9A and 9B in the X-channels, is actually comprised of two component wave forms. The first of these is illustrated as a staircase wave $n_1$ in FIGURE 6A. In order to paint each of the lines of a complete 40-line set in succession, the staircase wave $n_1$ begins at a negative lower limit such as $-V$. The potential of the $n_1$ signal is then increased time-wise by unit increments for each successive line, up to an upper limiting value of positive potential such as $+V$. In practicing the invention, values of $+20$ volts and $-20$ volts for $+V$ and $-V$ yielded satisfactory results. During the tracing of each line, the wave $n_1$ is held at a constant value. This wave form can be simply produced by applying pulses of fixed amplitude and duration to the input of a conventional integrator circuit connected within the $n$ generator stage. Such pulses are repeated at the basic rate of 2400 p.p.s. and the complete cycle is repeated at a constant rate such as 60 c.p.s. in the embodiment of the invention illustrated in FIGURE 5.

The other component of potential produced in each of the $n$ generator stages takes the form of a gradual saw tooth wave form $n_2$. The component $n_2$ is a slowly varying component which simulates motion. To prevent unbalance in the picture, the potential $n_2$ is returned to a lower limiting value $-V'$ whenever it has gradually ascended to the upper limiting value of potential $+V'$. The upper and lower limiting values may be set at $+.5$ and $-.5$ volt respectively.

The component $n_2$ has the function of maintaining the same number of lines on each side of the center line of the cathode ray tube. Thus, whenever lines which are traced upon the tube move around from left to right as a result of the aircraft motion, and the last line on the right disappears, a new line immediately appears on the left of the grid pattern to keep the picture balanced and symmetrical. The component $n_2$ shown in FIGURE 6B exhibits a rather slow time variation, and is characterized by a period measurable in seconds. According to the present invention, a linear potentiometer is arranged for continuous rotation of a motor driven slider tap to generate the saw tooth component $n_2$. The speed of the motor is proportional to $v_s \cos \theta - v \sin \theta$.

In order to explain in detail the circuitry and components which make up each of the $n$ generator stages shown in block diagram form in FIGURE 5, reference to FIGURE 7, which illustrates an $n$-generator, will now be made.

From the earlier portions of the detailed description, and more particularly from Equation 12 it will be recalled that the quantity $n$ occurs in the expression $dn/dt = 1/r(v_s \cos \theta - v \sin \theta)$. The derivation of an analog potential which properly represents this function of the aircraft heading angle $\theta$ is accomplished by the system illustrated in FIGURE 7. To accomplish this, the angle $\theta$ is applied simultaneously to a cosine potentiometer 16 and a sine potentiometer 17. The electrical signal $v_s$ which represents the sideward component of ground speed is applied to the cosine potentiometer 16. The negative amplitude of $v$, which reflects the forward component of ground speed is applied to the sine potentiometer 17. The output potentials from each of the potentiometers are applied to a summing amplifier 18. The algebraic sum of $(v_s \cos \theta - v \sin \theta)$ appears at the output of the amplifier 18 and is multiplied by the ratio $1/r$ in a conventional multiplier stage 19. The resulting product is applied directly to the motor 20 to control the output speed thereof.

Directly to the left of the motor 20 there is provided a linear potentiometer 21 which has a slider tap 22 connected to receive torque from the motor 20. Potential from a suitable source of unidirectional voltage 23 is dropped across the resistance portion of the potentiometer 21. The voltage drop sampled by the motor driven slider tap 22 is applied by way of conductor 24 to a summing amplifier 25. Directly to the left of the summing amplifier 25 there is illustrated an integrator stage 26. The integrator stage 26 is connected to receive repetitive input potentials of 2400 p.p.s. and 60 p.p.s., respectively. It will be recalled that the production of the $n_1$ signal may be accomplished by applying pulses of fixed amplitude and duration to the input of such an integrator. In FIGURE 7, these pulses are delivered at the rate of 2400 p.p.s., and the cycle repeats itself 60 times each second in response to the 60 c.p.s. triggering potential which is supplied to the integrator.

The output contribution $n_1$ of the integrator stage 26 is combined with the potential contribution from the potentiometer 21 in the summing amplifier 25 to produce the complete $n$ signal.

Continuing with the detailed description of other aspects of the invention, and more particularly with the explanation of the computing blocks 14A and 14B in FIGURE 5, the circuitry for deriving the analog contribution $$nKY \frac{r \cos \phi}{h \cos \theta}$$

will now be explained in conjunction with the FIGURE 8. In this figure, the analog component $nKY$ is applied to an amplifier 27 which is characterized by a gain of $r$. The output potential of the amplifier 27 consequently corresponds to the product $-nrKY$.

This product is applied to a conventional cosine potentiometer 28. The potentiometer 28 receives the variable $\phi$ in the form of a shaft input and derives the cosine of the input signal. The output potential provided by the potentiometer 28 thus takes the form $-nr \cos \phi KY$. This voltage is applied to a high gain amplifier 29 shown immediately to the right of the potentiometer 28.

The output potential of the high gain amplifier 29 is dropped across a linear potentiometer 30. The fraction of the voltage drop received from the potentiometer 30 is controlled by a slider arm which varies in position in accordance with the instantaneous value of the quantity $h$ or altitude.

By this means, the analog counterpart of the altitude is developed and is applied to cosine potentiometer 31. The cosine potentiometer is condition responsive to the variable $\theta$, which represents the heading angle of the aircraft. Variations in $\theta$ are allowed to control the cosine potentiometer 31 by means of a shaft angle input, or the like. The output signal developed by the potentiometer 31 is applied to the high gain amplifier 29. The gain of the feed-back loop around this amplifier will be seen to correspond to the term $h \cos \theta$.

The composite output potential made available by the high gain amplifier 29 comprises part of the KX contribution which is developed by each of the two X-deflection channels of the system. The complete KX contribution, of course, is given by the expression $$KY[nr \cos \phi/h \cos \theta - \sin \phi \tan \theta]$$

Turning to the circuitry and details necessary to derive the remaining terms of $V_x$, reference to FIGURE 9 will now be made.

In this figure KY from sawtooth generator 6 is multiplied by $\sin \phi$ by means of sine potentiometer 32. The potentiometer 32 is connected to reflect changes in the variable $\phi$ in terms of slider or tap displacement within the unit. An analog voltage $-Kp$ is applied to high gain amplifier 33. The output signal from amplifier 33 is sampled by a cosine potentiometer 34 which reflects changes in the variable $\phi$ by experiencing changes in the position of a movable slider or tap within the unit. It will be apparent to those skilled in the art that the quantity $\cos \phi$ defines the gain of the feedback loop around the high gain amplifier 33.

The output signal from amplifier 33 takes the form $$\frac{+Kp}{\cos \phi}$$

while the output signal from sine potentiometer 32 takes the form $KY \sin \phi$. These two signals are applied to the input terminals of summing amplifier 35 to derive the sum $$KY \sin \phi + \frac{Kp}{\cos \phi}$$

This sum is multiplied by $\sin \theta$, utilizing a second sine potentiometer 41. The output of potentiometer 41 is a voltage analog of the quantity $$\left(KY \sin \phi + \frac{Kp}{\cos \phi}\right)$$

$\sin \theta$, which is applied to the input terminals of high gain amplifier 42. The output of amplifier 42 is sampled and applied to a second cosine potentiometer 43, which is responsive to changes in the variable $\theta$. The expression $\cos \theta$ defines the gain of the feedback loop around high gain amplifier 42. The output signal from amplifier 42 therefore is $$-\left(KY \sin \phi + \frac{Kp}{\cos \phi}\right)\frac{\sin \theta}{\cos \theta}$$

which, of course, is identical with $$-\left(KY \sin \phi + \frac{Kp}{\cos \phi}\right) \tan \theta$$

This signal is applied to the input terminals of summing amplifier 44, together with the signal $$\frac{nKYr \cos \phi}{h \cos \theta}$$

derived from earlier computer stages. These two contributions are summed in amplifier 44 to complete the deflection voltage $V_x$, and produce the total voltage $$\frac{nKYr \cos \phi}{h \cos \theta} - \left[KY \sin \phi + \frac{Kp}{\cos \phi}\right] \tan \theta$$

It will be recalled that this form of the $V_x$ deflecting potential was set forth in Equation 9 earlier in the specification.

Circuitry for computer stage 7 which derives the term $+Kp \tan \phi$ is seen by reference to FIGURE 10. In this figure an analog contribution $+Kp$ is applied in the form of an input D.C. potential to a sine potentiometer 44. The potentiometer is connected to reflect changes in the variable $\phi$ in terms of slider or tap displacement within the unit. From the potentiometer 44 the output function $+Kp \sin \phi$ is applied to the input terminals of a high gain amplifier 45. The output signal derived by the amplifier 45 is sampled by a cosine potentiometer 46. The potentiometer 46 reflects changes in the value of the variable $\phi$ by experiencing changes in the physical position of a movable slider or tap provided within the unit.

The output of cosine potentiometer 46 is reapplied to the input of the high gain amplifier 45. It will be apparent to those skilled in the art that the quantity, cos $\phi$ defines the gain of the feedback loop around the high gain amplifier 45.

The output signal from amplifier 45 takes the form $$+Kp\frac{\sin \phi}{\cos \phi}$$

which is of course identical with $+Kp$ tan $\phi$. This term is applied to summing amplifier 47. The contribution KY produced by saw tooth generator 6 is also applied to the amplifier 47. The output signal of the amplifier 47 comprises the $V_y$ deflection potential for the cathode ray tube, and takes the form $KY+Kp$ tan $\phi$. It will be recalled that this form of the $V_y$ deflection potential was set forth in Equation 7 earlier in the specification.

In concluding the detailed description of the several stages and components of the invention, reference to FIGURE 11 will now be made. The performance of the inventive system in accordance with the mathematical relationships derived from FIGURE 2 may be regarded as satisfactory through substantially all ranges of the variables such as $\theta$, $\phi$, $h$ and the like. When the heading angle $\theta$ approaches 90°, the limitation of those expressions where cos $\theta$ appears in the denominator to sufficiently large finite values may be advisable. Such limitation produces only imperceptible deviations from the ideal grid pattern sought to be produced.

The modified cosine potentiometer structure illustrated in FIGURE 11 may be employed in order to completely avoid the problem. In the potentiometer system illustrated in this figure the 90° zero voltage point is actually "jumped over" to eliminate the problem. This potentiometer is modified in order to provide a jumper 37 connected to the resistance winding 40 at the 89° and 91° positions, said jumper 37 having a gap 38 at the 90° position of the winding 40. The potential on slider 36 is thereby prevented from going through zero in order to eliminate attempts by the computers in the system to utilize magnitudes of zero in the denominator any expressions where cos $\theta$ occurs.

While particular embodiments of the invention have been shown and described herein, it is not intended that the invention be limited to such disclosures but that changes and modifications can be made and incorporated within the scope of the claims.

What is claimed is:

1. In an airborne electronic system for visually indicating the posture of an aircraft with respect to the ground terrain beneath the aircraft on a cathode ray tube, a first channel for deriving Y-axis deflection voltages which includes a saw tooth generator and a computer stage connected to said saw tooth generator for computing the analog contribution $+Kp$ tan $\phi$; second and third channels for deriving a pair of X-axis deflection voltages, said channels each including a saw tooth generator and computer stages connected to said saw tooth generator for deriving and combining the analog contributions KX and $$\frac{Kp \tan \theta}{\cos \phi}$$

and electronic switching means for rendering said X-axis deflection voltages alternately available to the X-axis deflection plates within said cathode ray tube.

2. In an airborne electronic system for visually indicating the posture of an aircraft with respect to the ground terrain beneath the aircraft on a cathode ray tube, means including an oscillator and a pulse generator connected to said oscillator for producing a time-spaced series of voltage pulses, means including a saw tooth generator connected to said pulse generator and a first computer stage connected to said saw tooth generator for deriving deflection potentials for the Y-axis deflecting plates of said cathode ray tube, means including a saw tooth generator connected responsive to a first n-generator for deriving deflection potentials for application to the X-axis deflecting plates of said cathode ray tube to trace a set of north-south lines, means including a saw tooth generator connected responsive to a second n-generator for deriving deflection potentials for application to the X-axis deflection plates of said cathode ray tube to trace a set of east-west lines, and means including electronic switch means for applying said deflection potentials for said east-west lines to said X-axis deflection plates alternately with said deflection potentials for said north-south lines.

3. In an airborne electronic system for visually indicating the posture of an aircraft with respect to the ground terrain beneath the aircraft on a cathode ray tube, a first channel for deriving Y-axis deflection voltages which includes a saw tooth generator and a computer stage connected to said saw tooth generator for computing the analog contribution $Kp$ tan $\phi$; second and third channels for deriving a pair of X-axis deflection voltages, said channels each including a saw tooth generator and computer stages connected to said saw tooth generator for computing and combining the analog contributions KX and $$\frac{Kp \tan \theta}{\cos \phi}$$

electronic switching means for rendering said X-axis deflection voltages alternately available to the X-axis deflection plates within said cathode ray tube, and compensating means electrically interposed between said Y-axis deflection potentials, said X-axis deflection potentials and the deflection plates of said cathode ray tube to simulate the effect of aircraft roll upon the cathode ray tube display.

4. In an airborne electronic system for visually indicating the posture of an aircraft with respect to the ground terrain beneath the aircraft on a cathode ray tube, a source of time-spaced voltage pulses, first means connected to said source of time-spaced voltage pulses to derive a Y-axis deflection signal for application to the Y-axis deflection plates of the cathode ray tube, frequency reduction means connected to said source of voltage pulses, second means comprising a pair of symmetrically identical channels, the first channel connected to said source of time-spaced voltage pulses and to the output of said frequency reduction means to derive a first X-axis deflection signal and the second channel connected to said source of voltage pulses and to the output of said frequency reduction means to derive a second X-axis deflection signal, and electronic switch means connected to the first and second channels of said second means to render the first and the second X-axis deflection signals alternately available to the X-axis deflection plates of the cathode ray tube.

5. The system of claim 4 in which the first and the second channels of said second means each include a computer stage for receiving and operating upon altitude, pitch angle and heading angle data of the aircraft to derive the X-axis deflection signals.

6. In an airborne electronic system for visually indicating the posture of an aircraft with respect to the ground terrain beneath the aircraft on a cathode ray tube, first means including an oscillaor and a pulse generator connected to said oscillator for producing time-spaced voltage pulses, second means including a sawtooth generator connected to said pulse generator and a computer stage connected to said sawtooth generator to derive a Y-axis deflection signal, frequency reduction means connected to said first means, third means connected to said first means and to the output of said frequency reduction means for deriving a first X-axis deflection signal, fourth means connected to said first means and to the output of said frequency reduction means for deriving a second X-axis deflection signal, coordinate rotator means connected to said second means for electrically modifying the Y-axis and the first and second X-axis deflection signals prior to application to the respective pairs of deflection plates of the cathode ray tube, and electronic switch means connected to said frequency reduction means and to said third and said fourth means to render the first and the second X-axis deflection signals alternately available to said coordinate rotator means.

References Cited in the file of this patent

UNITED STATES PATENTS

| | | |
|---|---|---|
| 2,390,840 | Koren | Dec. 11, 1945 |
| 2,432,029 | Manildi | Dec. 2, 1947 |
| 2,529,601 | Freehafer | Nov. 14, 1950 |
| 2,532,158 | Ewing | Nov. 28, 1950 |
| 2,596,472 | Ergen | May 13, 1952 |
| 2,616,078 | Flyer | Oct. 28, 1952 |
| 2,648,061 | Parker et al. | Aug. 4, 1953 |
| 2,849,707 | White | Aug. 26, 1958 |
| 2,879,002 | Longerich | Mar. 24, 1959 |
| 2,967,263 | Steinhauser | Jan. 3, 1961 |

OTHER REFERENCES

"Navy Unvick Device for Driving Plane," Hangland, April 16, 1958, Washington Evening Star, page A-19.

"Man-Machine Systems Call for Displaying Integrated Instrumentation," Douglas et al., July 1958, "Electronic Industries," pages 68-71.